F. H. HOPKINS.
AIR BRAKE RECORDING APPARATUS.
APPLICATION FILED OCT. 26, 1916.
1,404,770.
Patented Jan. 31, 1922.
3 SHEETS—SHEET 1.
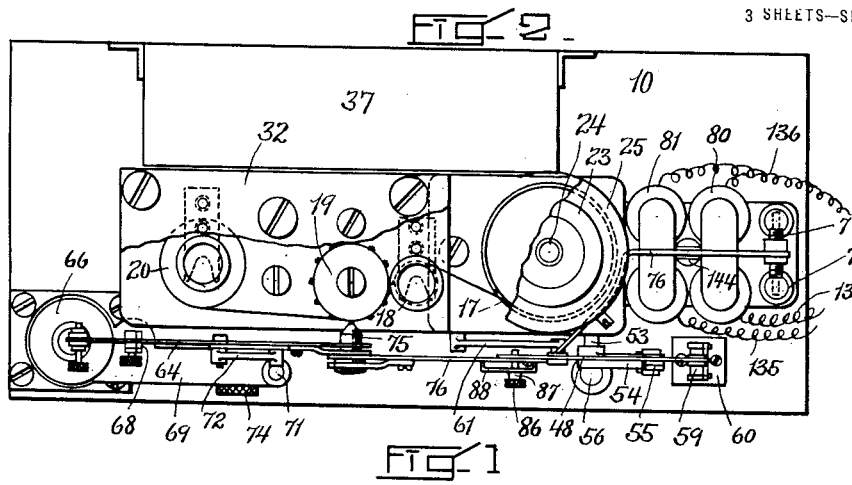
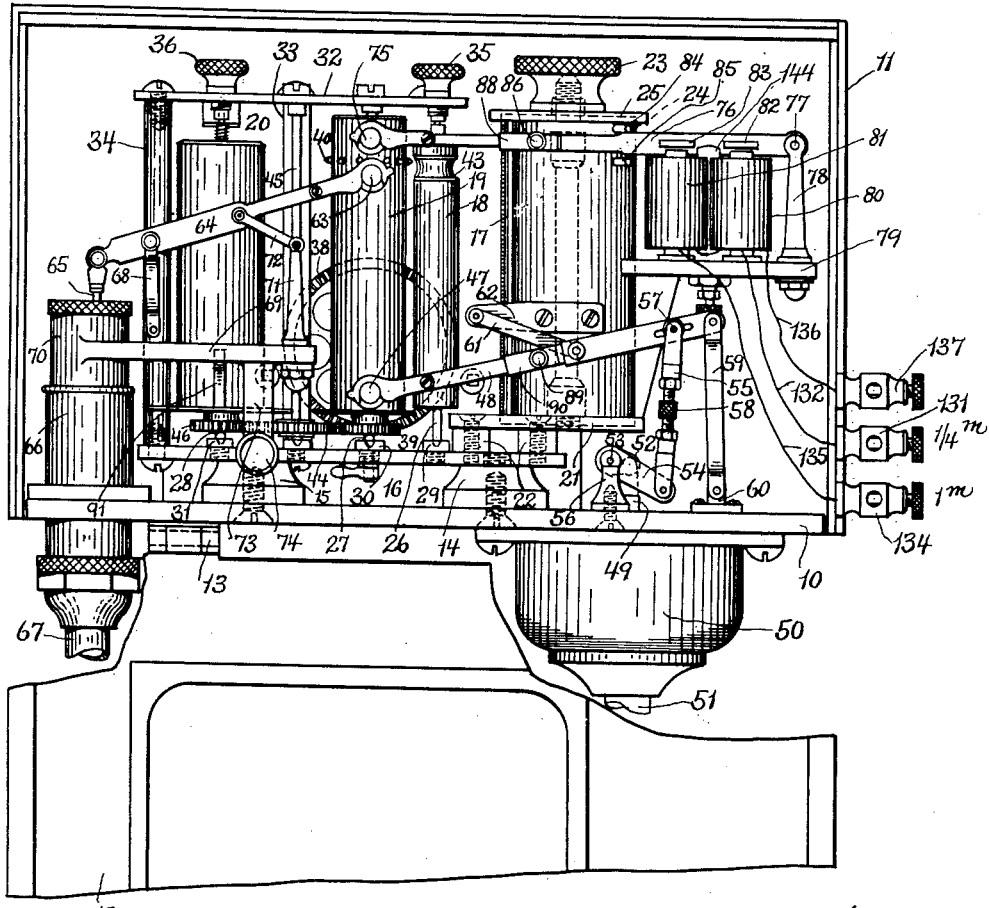
INVENTOR=
FRANK H. HOPKINS
ATTORNEYS

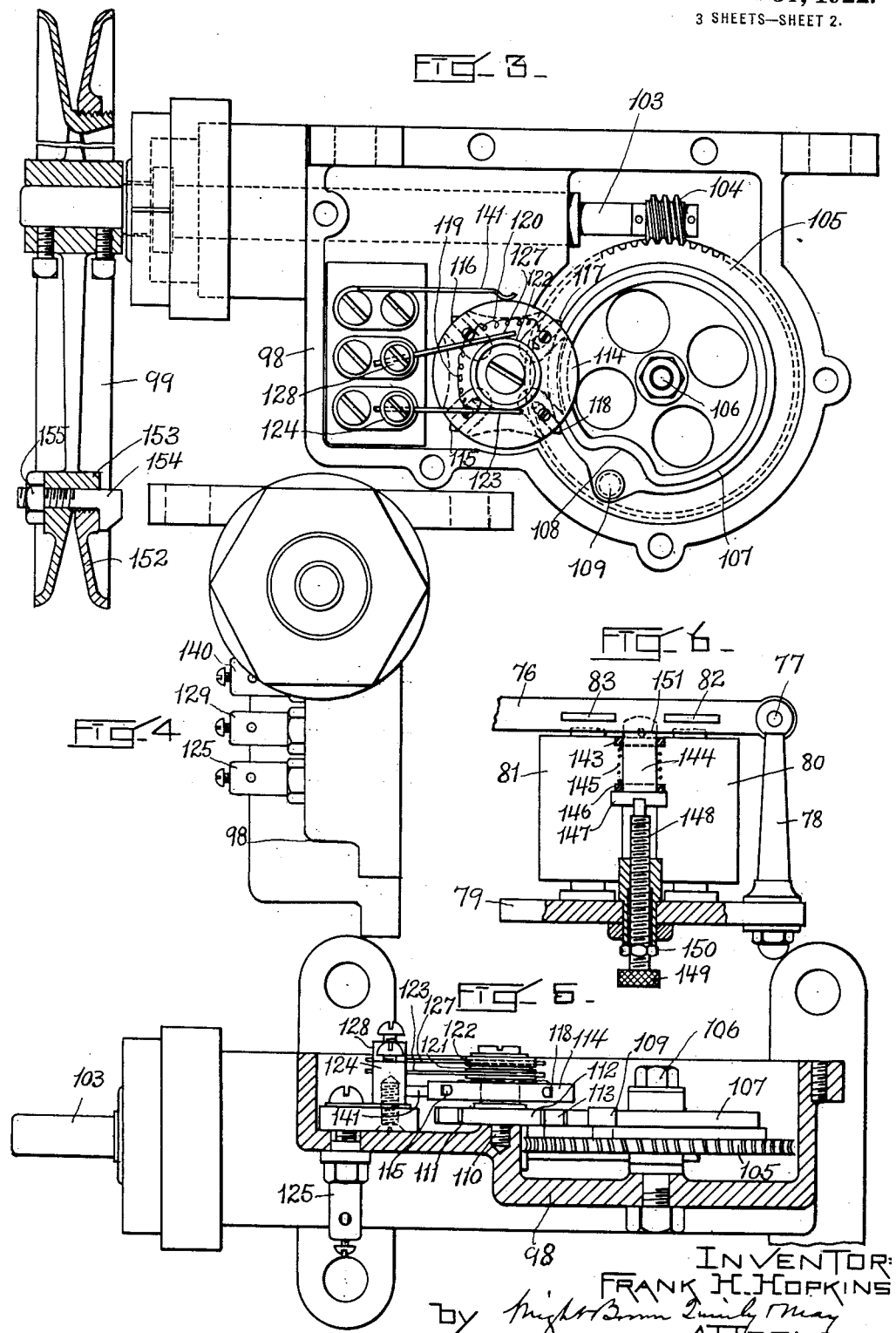

F. H. HOPKINS.
AIR BRAKE RECORDING APPARATUS.
APPLICATION FILED OCT. 26, 1916.

1,404,770.

Patented Jan. 31, 1922.

INVENTOR:
FRANK H. HOPKINS
ATTORNEYS

UNITED STATES PATENT OFFICE.

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

AIR-BRAKE RECORDING APPARATUS.

1,404,770.   Specification of Letters Patent.   Patented Jan. 31, 1922.

Application filed October 26, 1916. Serial No. 127,826.

*To all whom it may concern:*

Be it known that I, FRANK H. HOPKINS, a citizen of the United States, residing at Somerville, in the county of Middlesex and State of Massachusetts, have invented new and useful Improvements in Air-Brake Recording Apparatus, of which the following is a specification.

The present invention relates generally to pressure recording instruments and is particularly designed to record in a known synchronized relation the character and amounts or degrees of different pressures acting simultaneously, or of forces applied and movements resulting therefrom, to the end that from the record thus made the pressures or other forces and the results thereof occurring at the same time, or at particular instants of time, may be made known readily and accurately. One specific use for which the invention is adapted, which is described in detail in the following specification is that of recording the pressures maintained in the air brake systems of railway trains, street cars, etc., having air brakes; the pressures used in applying the brakes; the manner in which the pneumatic pressure is expended for this purpose; and the times when pressure is thus applied, together, when required, with the speed of the train. My object has been to provide a compact instrument capable of giving accurately and continuously all or any part of the information above indicated of various specific characters for various specific purposes. The invention as embodied in the apparatus here illustrated comprises, in connection with means for supporting and propelling a record sheet at a uniform and known speed, a recording indicator for showing one pressure, which may be the pneumatic pressure maintained in the system, and called the train line pressure, and the fluctuations thereof when the brakes are applied; a second recording indicator for showing another pressure, which may be that known as the brake cylinder pressure, expended in applying the brakes and the mode in which such pressure is utilized; and a recording element operated periodically by electro magnetic means under control of the travel of the train for indicating on the chart distances traveled, and therefrom in connection with the rate of feed of the chart, the speed of the train.

In its more general aspects, the invention comprises the combination of a plurality of recording indicators or markers operating on the same sheet in connection with time indications in such manner that events in the respective records made by such markers occurring at the same instant of time are readily and exactly identifiable; and the further combination therewith of a periodic marker which is controlled independently of the first-named marker to make characteristic indications on the record at stated periods.

The instrument or apparatus which embodies the preferred construction of the principles involved in my invention is described in the following specification and illustrated in the accompanying drawings in which—

Figure 1 is a front elevation of the recording instrument proper, that is, the recording part of the apparatus.

Figure 2 is a plan view of this part of the apparatus shown as removed from the enclosing casing.

Figure 3 is a side view of a commutator apparatus which controls electrically the speed recording device in accordance with the speed of the train.

Figure 4 is an end view of said apparatus.

Figure 5 is a plan view of the same as viewed from beneath, the box or casing thereof being shown in section.

Figure 6 is an elevation with parts broken away showing in detail the adjusting means for the speed recording device.

The same reference characters indicate the same parts in all the figures.

Figure 7:
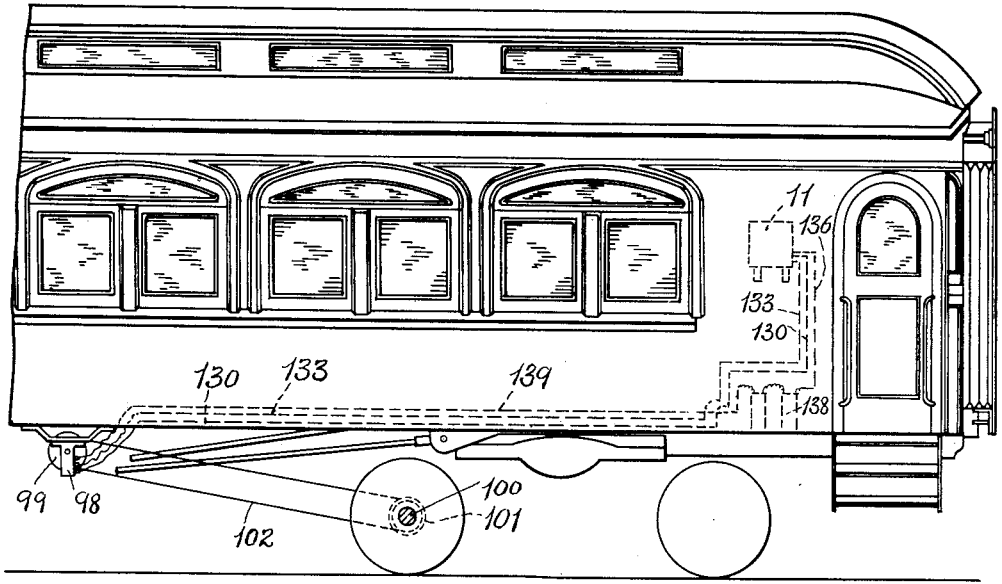
Figure 7 represents part of a railway car showing diagrammatically the mode of applying my apparatus thereto.

The recording part of the apparatus is mounted on a base plate 10 to which is secured a casing 11 enclosing the instrument, the front wall 12 of which is connected by hinges 13 to the base so that it may be opened to give access to the instrument, and closed and locked to prevent tampering therewith. In Figure 1 the front wall is shown as being opened and hanging down from the base plate. In Figure 2 the entire base plate is shown in plan, represented as though the casing had been entirely removed.

On the base plate are pedestals 14, 15 which support a plate 16 whereon are mounted a drum 17, carrying the record sheet, which is ordinarily a wide paper strip, and will hereafter be so called, a guide roll 18 for the paper strip, a driving roll 19, and a take-up roll 20. The drum 17 is a hollow shell containing the paper strip in a rolled up condition in its interior. It rests upon a plate 21 supported somewhat above and on the plate 16 by blocks 22 and is secured to the plate by screws as shown in Figure 1. The drum is secured by a nut 23 threaded on a post 24 which is secured in the plate 21 and passes through the axis of the drum, such nut bearing on a disk 25 which covers the upper end of the drum.

The rolls 18, 19, and 20 are rotatable, having pivot staffs 26, 27, 28, respectively, which turn in step bearings 29, 30, and 31, respectively, mounted on the plate 16. The upper ends of these rolls have similar pivots or trunnions which turn in bearings set in an upper plate 32 supported on posts 33, 34, which rise from the plate 16, and are secured thereto by screws. The bearings for the upper pivots of the rolls 18 and 20 are provided with enlarged heads 35, 36 respectively and are threaded through the plate 32, so that they can be withdrawn readily and without the use of wrenches or screw drivers to permit removal and replacement of these rolls for threading in the record strip.

Figure 8:
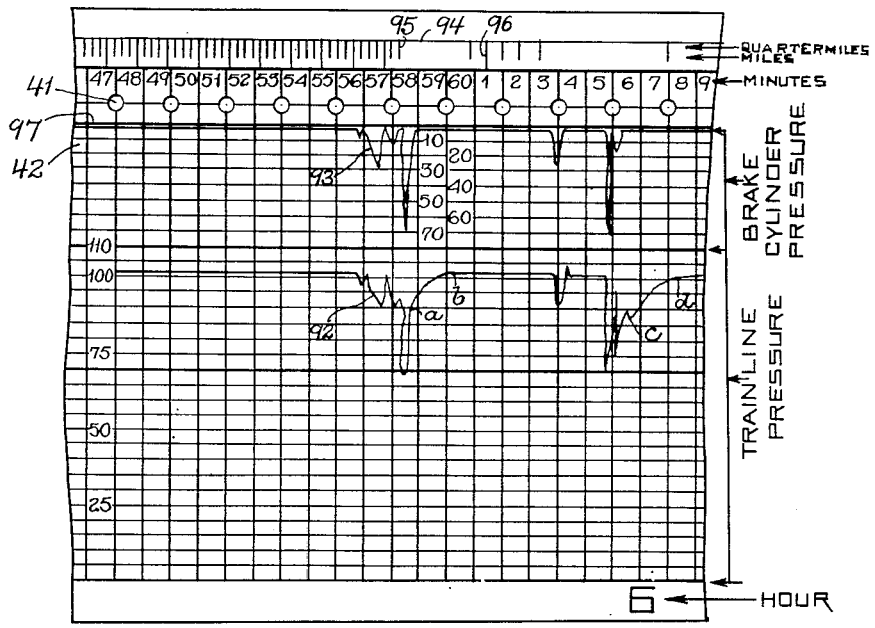
Figure 8 represents a fragment of the record chart used in my apparatus showing a part of the record made on the chart thereby.

For driving the roll 19 to propel the record strip I provide a clock movement, or in other words a uniformly running spring motor which is contained in a box 37 mounted on the base plate 10 in rear of the parts above described. This motor may be a clock movement of any standard or other approved design, wherefore I have not illustrated it any further than to show the external driving wheel 38 of the movement, which appears in Figure 1. Other motors than those of the spring type may equally well be used in some circumstances for driving the strip. Wheel 38 is a crown gear driving a pinion 39 on the staff of the roll 19 through an interposed idler 39ª. The roll has a series of projecting pins 40 arranged in a plane transverse to its axis which are equally spaced around the roll and are adapted to enter correspondingly spaced holes 41 in the record strip 42 shown in Figure 8. The guide roll 18 has a groove 43 in the same plane with the pins to give clearance for the latter. The take-up roll 20 is driven from the gear 39 by an idle gear 44 on a staff 45, which is mounted to turn in bearings similar to those of the roll 19 in the bottom plate 16 and top plate 32, the gear 44 driving the pinion 46 on the take-up roll. The connection between the pinion and take-up roll is frictional, that is, adapted to slip so that the paper will not be broken on account of increase in linear peripheral speed of the surface on which the paper is rolled due to accumulations of paper on the take-up roll. As here shown the pinions 39 and 46 are equal and the take-up roll is somewhat greater in diameter than the driving roll in order to insure that the strip will be wound up as fast as delivered, and will be held under constant tension. Any other proportions of gearing and roll diameters may be adopted to secure the same end.

For recording the pressures and fluctuations thereof in the train line, I provide a marker 47 which may be a pen of the type commonly used in recording instruments, carried by an arm 48 which is actuated by a plunger or piston rod 49 entering a chamber 50 connected by a conduit 51 with the train line pipe on the car or engine wherein the apparatus is installed. Chamber 50 contains a diaphragm in position to be acted on by the pneumatic pressure admitted to the chamber and to press upwardly on the plunger 49, such movement of the diaphragm being resisted by a spring. The character and arrangement of the diaphragm and spring are preferably the same in substance as the diaphragm and spring shown in Figure 1 of my pending application filed April 4, 1914, Serial Number 829,527 entitled Recording apparatus, to which reference is hereby made. Endwise movement of the plunger 49 actuates the pen arm 48 through an arm 52 on a rock shaft 53, a second arm 54 on said rock shaft and a link 55. Other means capable of transmitting pressure in a manner such as to turn the rock shaft may evidently be substituted for those here described with equivalent effect for this use and other uses for which the instrument is adapted. Rock shaft 53 is mounted in bearings in a post 56 on the base plate 10, and the relation between the arms 52 and 54 is substantially the same as that between the arms 93 and 95 of the apparatus shown in my application above identified, that is, making such an angle with one another that equal increments of pressure acting on the plunger produce equal movements of the marker 47. The pivot connection at 57 between the link 55 and pen arm 47 is adjustable as to position in the well known manner, for calibrating the marker, and the link 55 is adjustable in length by being divided into two parts and the parts connected by a double ended screw 58 having oppositely inclined threads on its ends, for the purpose of adjusting the marker accurately at the zero line of the record chart when there is no pressure, above the atmospheric, acting on the indicator apparatus. The fulcrum for the pen arm 48 is on a link 59 pivoted to a standard 60 on the base plate, and the pen or marker is guided to travel in a straight line by a link 61 pivoted at one end to the pen arm and at the other to a fixed bracket 62 on the drum 17.

The recording indicator for the brake cylinder pressure consists of a pen or other suitable marker 63 carried by an arm 64 which is connected to a piston rod 65 leading from a piston in the indicator cylinder 66, which piston is operated by pressures admitted to the indicator through a pipe 67 connected with the air brake operating cylinder of the car in which the apparatus is installed. A spring resists the pressure-impelled movements of the piston in the same manner as is employed in the common and well known steam engine indicators. The fulcrum link 68 for the pen arm 64 is mounted on a rigid bar 69 projecting from a sleeve 70 which is swiveled on the indicator cylinder. The same bar or arm 69 carries a post 71 which supports the guiding link 72 for guiding the marker 63 in a straight line. A depending lug 73 from the bar 69 carries an adjustable stop screw 74 adapted to abut on the plate 16 and so regulate the pressure with which the marker 63 bears on the record strip. Other means than a cylinder and a cooperating piston may, however, be provided for transmitting pressures to the marker.

A third marker 75, preferably a pen similar to the markers 47 and 63, makes periodic indications which in the particular use, now being described, record the distance traveled by the car, and is carried by an arm 76 pivoted by trunnions 77 having their bearings in posts 78 mounted on a bracket 79 fixed to the paper-containing drum 17. The bracket also supports electro-magnets 80 and 81 of which the armatures 82 and 83, respectively, are carried by the arm 76. Magnet 80 is designed to actuate the marker 75 at any desired intervals, for instance every quarter mile, and the magnet 81 to actuate the said marker at longer intervals, for example every full mile. Although in the use of the invention here particularly described, the periods designated by the marker 75 are distances, the same or an equivalent marker may be equally well operated to record periodic evidence of other specific denominations, such for example as intervals of time, or in recurring similar actions, and so forth. These magnets move the marker through different distances, respectively, in a manner which I will presently describe, so as to make different characters of marks for the quarter mile and full mile indications. The arm 76 plays between stop pins 84 and 85 which are mounted on the drum 17.

It is important that the markers, when the same are pens containing fluid ink, should touch the paper with just enough pressure to cause them to write freely. To regulate this pressure, in case of the arm 76, I provide an adjusting screw 86 which is threaded through the arm and has a shoulder 87 bearing on a bridge 88 the ends of which bear on the arm at opposite sides of the screw. The effect produced by the screw is to spring the arm more or less, whereby the pen point is caused to press more or less firmly against the paper, the fulcrum or pivot of the arm being so held as to provide the necessary reaction. A similar screw 89 and bridge 90 are provided for the arm 48, acting to like effect. The adjusting screw 74 on the bar 69 provides the same character of adjustment for the pen 63, the friction of the sleeve 70 on the indicating cylinder 66, retaining the pen in contact with the paper. The swivel mounting of arm 69 enables the pen arm 64 to be swung out of the way when a recorded chart is to be removed or a new chart to be put in place.

The course of the paper is from the interior of the drum 17, through a slot in the side of which it passes, thence back of the guide roll 18 and in front of the driving roll 19 and take-up roll 20. In removing a recorded chart, the thumb screw 36 is withdrawn far enough to release the upper pivot of the drum 20 and such drum is then withdrawn, after the paper has been cut and the pen arm 64 swung forward out of the way. In inserting a new record sheet, the guide roll 18 is removed by withdrawing the bearing thumb screw 35, and the paper drawn forward until it can be engaged with a spring clip 91 on the take-up drum 20. The latter is turned by hand until the paper has been wrapped once about it, and the end properly passed back of the strip. Then the guide roll 18 is returned to position, displacing the paper into position back of it. A new rolled blank chart may be readily placed in the drum 17 after simply removing the nut 23 and cover 25, which may be removed and replaced without the need of tools of any sort.

It will be noted that the three markers 47, 63, and 75 are all in alinement in a radial plane of the driving roll 19, whereby they act in the same vertical zone of the chart and their several records are exactly synchronized. This condition is shown by the illustration of a fragment of the record chart shown in Figure 8. In this Figure, 92 represents the line drawn by the marker 47; 93 that drawn by the marker 63; and 94, with its cross lines 95 and 96, the record made by the marker 75. The sheet is divided by time lines into vertical columns at the head of which are numbers representing time intervals, viz: minutes, running consecutively and in rotation from 1 to 60, in the case of the chart here illustrated. The hour indications are placed at the bottom of the chart. The chronometer motor is of course adjusted and geared so as to drive the sheet through a distance equal to the width of one column each minute. The points in the recorded lines cut by the time lines show the times at which the recorded events occurred, whereby lines 92 and 93, read in connection with the time scale at the heads of the columns show the time consumed by each fluctuation of pressure in the train line and the brake cylinder, respectively, occasioned by each application of the brakes, and the correspondence of particular points in the recorded lines with one another, while the marks 95 and 96 in connection with the same time indications show the distance traveled by the train in the same periods. The arrangement causing the indications which are made at the same instant of time to be marked on the sheet in a definite predetermined alinement is what I mean by the term "synchronize" in connection with the arrangement of the records, and is an invaluable aid in the study of the operations recorded on the chart because it permits determination and identification of the actions which occurred at the same instant of time. If desired the chart may be adjusted so that the passage of the time indications past the recording line, that is, the line in which the markers travel, will correspond to the actual times of day, but such condition is not necessary, and it is usually more convenient to have the motor in operation only during the run of the train, and in that case the time indications on the chart show the elapsed time from the commencement of the run; and the times of application of the brakes are measured from this starting point. By adding to the record a correction for the known time of setting the motor in operation, the actual time of day at which any brake application was made may be accurately determined when ever necessary.

The chart is provided with equally spaced horizontal lines indicating intervals of pressure. There are two sets of pressure indications, one for the zone in which the marker 47 operates running from zero at the bottom of the chart in five pound intervals to one hundred ten pounds, and the other, in the zone traversed by the marker 63 running from the zero line 97 downward in ten pound intervals to the seventy-five pound line, which is the one hundred ten pound line of the first zone. It is to be understood that the denominations, units and spaces marked on the chart may be varied according to circumstances without departing from the principles of the invention, and that those here illustrated and described, are given only for illustration.

The distance marker 75 is operated electrically under the control of the movement of the train by means which I will now describe, in connection particularly with Figures 3 to 7 inclusive. The latter figure shows in dotted lines at 11 the position of a recording instrument, such as has been above described, in a railroad car. 98 represents the frame of a mechanism which I may call for the present purpose a timer, which includes a shaft and a pulley 99 mounted on such shaft and driven from one of the wheel axles 100 by a pulley 101 on the latter and a belt 102.

Referring now to Figures 3 and 5 the shaft on which the pulley 99 is mounted is shown at 103. It carries a worm 104 which meshes with a worm wheel 105 mounted on a stud 106 in the frame 98. Connected with the worm gear 105, conveniently as an integral part thereof is a flange 107, the outer periphery of which is a complete circle except at one point (108) where it is concaved or recessed. A pin 109 is mounted on the side of the worm gear at the center of curvature of the recess 108 and in the same zone with the surface 107. Mounted on a stud 110 parallel to the stud 106 is a disk 111 having in its periphery four concave segments 112, of which the radius and center of curvature are approximately the same as of the outer circumference of the flange 107. Between the segments 112 are radial slots 113 adapted to be entered by the pin 109. When the pin thus enters one of the slots the concave part 108 is adjacent to the projecting part of the disk in which the slot 113 is located, thereby allowing the disk 111 to be turned. At other times the disk is locked against rotation by the projection of flange 107 into one or another of the recesses 112. This gearing is one form of the well known Geneva stop motion, and is designed to turn the disk 111 one-quarter of a turn for each complete rotation of the gear 105. The ratio of pulleys 99 and 100 to each other and to the car wheel, and the value of the worm and wheel gearing may be such that this effect occurs upon each quarter mile of travel of the car.

Connected with the disk 111 so as to turn therewith is a disk 114 of insulating material which carries four projecting contact points 115, 116, 117 and 118, respectively, these points being all isolated in the non-conducting material of the disk. The points 115, 116, and 117 are, however, in electrical connection with one another by wires 119 and 120 through binding screws which pass through the side of the disk into contact with the contact points, as shown in Figure 3. Slip contact rings 121 and 122 are mechanically connected with the disk 114 but are electrically insulated from one another. Ring 121 is in electrical connection with one of the contact points, as 116, and through the wires 119 and 120 with the points 115 and 117. The fourth point 118 is alone connected with the ring 122.

A brush 123 is arranged in contact with the ring 121 and is mounted in a post 124 which is electrically connected with an external binding post 125 mounted on the timer casing. A similar brush 127 makes contact with the ring 122 and is secured to a post 128 in electrical connection with a second external binding post 129. The post 125 is connected by a wire 130 with a binding post 131 on the case 11 of the recorder, from which a wire 132 runs to the electromagnet 80. A wire 133 runs from the post 129 to a post 134 on the casing 11, and a wire 135 runs from the latter post to the magnet 81. A single return conductor 136 completes the circuit of both magnets and is connected to a binding post 137 on the case 11, and from the latter to a battery 138. The battery is also connected in circuit with a conductor 139 which runs to a third binding post 140 on the timer casing and is connected with a contact spring 141 which bears constantly on the periphery of the disk 114.

As will now be evident, the battery circuit is open at all times except when one of the four contact points touches the spring 141. When any one of the points 115, 116, 117 makes such contact, the circuit is completed through the magnet 80, and the marker 75 is actuated to make one of the short marks 95 on the chart; and when the contact point 118 touches the spring 141 the circuit is completed through the magnet 81 which moves the marker 75 through a longer distance to make one of the marks 96. Thus there are three operations of the magnet 80 to one actuation of the magnet 81, and three quarter mile marks are made between each two mile marks. The duration of contact between any of the points and the spring 141 is brief, while the travel of the chart is so slow in comparison, that the marks made by the descent and return of the marker 75 coincide and are perpendicular to the horizontal line traced by the marker while the magnets are inoperative.

In order that the marks 95 may be shorter than the marks 96 I provide a spring resisted stop which arrests the arm 76 when the magnet 80 actuates it, but is adapted to yield under the stronger pull exerted by the magnet 81 by virtue of the longer leverage through which the latter acts on the arm 76, armature 83 being approximately twice as far from the fulcrum 77 as the armature 82. The stop (see Figure 6) comprises a ring 143 mounted on a slotted post 144 which is set in the magnet base 79 and rises between the two magnets. This stop ring is supported by a spring 145 which rests on a second ring 146, the latter being supported by the ends of a bar 147 which passes through a slot in the post 144 and is centrally engaged with a screw 148 passing through the threaded lower part of the post and entering a notch in the bar. The screw 148 has a knurled head 149 in accessible position for regulation, and carries a lock nut 150. Stop ring 143 is retained on the post by studs 151 projecting at opposite sides of the post. Arm 76 occupies the upper end of the slot in the post. Screw 148 is adjusted until the resistance opposed by the spring 145 to displacement of the stop ring 143 is greater than the force applied by the arm 76 under the pull of magnet 80, but less than the force so applied by the magnet 81, whereby the latter magnet is able to move the marker farther than magnet 80 can move it, and until it is arrested by the stop pin 85.

I provide means for adjusting the effective diameter of the pulley 99 in order to synchronize the movement of the timer with the rate of travel of the car for correcting by variations in car wheel diameter. For this purpose, the pulley, which is designed for being driven by a round belt, has one of its flanges 152 made as part of a separate annulus threaded on a hub 153 opposite to the fixed flange of the pulley. A locking bolt 154 passes through the fixed part of the pulley and its head bears on the outer side of the annulus. It is secured by a nut 155 threaded on its shank. Evidently by adjusting the movable flange toward the fixed flange the distance which the round belt can enter the groove is diminished, and the effective diameter of the pulley by that much increased; while the reverse effect is obtained by adjusting the movable flange away from the fixed flange.

The instrument shows the train line pressure at all times; the reduction of pressure and the character of such reduction, that is, whether uniform or fluctuating in the train line at each application of the brakes; and the length of time required to recharge the train line after applying the brakes. The latter indication is shown in the particular chart illustrated in Fig. 8 by the curve in the line 92 from the point *a* to the point *b*, and similarly from the point *c* to the point *d* in another part of the same line. It also shows the manner in which the pressure is utilized in the brake cylinder, and by comparison of the two pressure lines, whether there is a leakage in the train line or the brake cylinder, and whether the pump governor is properly adjusted or not. It also shows the mileage and speed of the train, the length of time occupied in stops, and the character of retardations and accelerations. It furnishes absolute and accurate evidence in case of accidents, by recording when and how the brakes were applied, and whether in such a way as to tend to cause or to prevent the accident. It settles every argument as to the cause of flat wheels, whether due to ordinary service or emergency applications of brakes, and furnishes indisputable evidence of the efficiency of all pressure and pressure regulating appliances. It affords a means of determining and comparing the efficiency of engine drivers automatically and accurately by recording their actions in that phase of engine driving, application of the air brakes, which most completely tests the qualities of skill, judgment, and self-possession of the driver.

The instrument may be directly applied to any car of any train or to the locomotive, if desired, and likewise to any other vehicle, such as a street car, equipped with an air brake system.

In describing, as I have, the special adaptation of the invention to its main purpose of recording the workings of train air brakes, I have not intended to exclude from the scope of the protection which I claim any other uses to which the principles of the invention are applicable; nor have I intended the detailed description of a particular instrument to limit my invention to the specific construction and arrangement of this instrument, or in any other manner as set forth in the appended claims.

What I claim and desire to secure by Letters Patent is:

1. An instrument for recording operations of air brakes comprising means for feeding a record sheet at a regular rate of speed, a marker and operating mechanism therefor arranged to record the pressures and fluctuations of pressure in the supply of pneumatic operating fluid, a marker and mechanism for operating the same for recording the pressures employed in setting the brakes, a third marker for recording the distances traveled by the vehicle in which the apparatus is installed, and means operated by the movement of the vehicle for actuating said third marker, all three markers being and operating in the same straight line.

2. An instrument for recording the operations of air brakes on trains comprising means for feeding a record sheet at a regulated uniform rate in a given direction and two indicator instruments each having a marking element and pressure operated mechanism for moving said marking element in a straight line, said indicator instruments being arranged so that their marking points travel in the same line transverse to the direction of movement of the sheet, one of said indicator instruments being operated by pneumatic pressure of the air stored for operating the brakes, and the other by the pressure of the air applied for operating the brakes.

3. An instrument for recording the operations of air brakes on trains comprising means for feeding a record sheet at a regulated uniform rate in a given direction and two indicator instruments each having a marking element and pressure operated mechanism for moving said marking element in a straight line, said indicating instruments being arranged so that their marking points travel in the same line transverse to the direction of movement of the sheet, one of said indicator instruments being operated by the pneumatic pressure of the air stored for operating the brakes, and the other by the pressure of the air applied for operating the brakes, a distance indicating marker mounted to travel in the same line with the other markers, and means for operating said distance marker periodically in accordance with the distance traveled by the car in which the apparatus is installed.

4. An apparatus for recording air brake operations comprising means for showing the pressures and fluctuations thereof in the air supply provided for operation of the brakes, and means for making in parallel therewith a record of the pressures employed in setting the brakes, said records being exactly synchronized the one with the other.

5. An apparatus for recording air brake operations comprising means for showing the pressures and fluctuations thereof in the air supply provided for operation of the brakes, means for making in parallel therewith a record of the pressures employed in setting the brakes and means for recording in exact synchronism with the records produced by the above described means the distances traveled by the vehicle in which the apparatus is installed.

6. An apparatus for recording air brake operations comprising a record sheet, means for propelling the same, marking means bearing on the sheet for showing the pressures and fluctuations thereof in the air supply provided for operation of the brakes, marking means also bearing on the sheet for making in parallel therewith a record of the pressures employed in setting the brakes, and marking means bearing on the sheet for recording in parallel with the records produced by the above described means the distances traveled by the vehicle in which the apparatus is installed, all of said mechanisms being in exact synchronism with one another to record indications made at any given instant in the same line transverse to the sheet.

7. A pressure recording instrument comprising mechanism for propelling a record sheet, a plurality of automatic pressure operated indicators, each having a marker, so arranged that the several markers are adapted and constrained to move in the same line transverse to the direction of travel and at the same side of the sheet, the sheet being supported on the side opposite to the markers against the pressure exerted by the latter, a periodic marker in line with the pressure operated markers, and independent means for actuating said periodic marker from time to time.

8. The combination with a record sheet propelling mechanism and means for recording on the sheet so propelled air pressures in the brake operating system of railway rolling stock, a speed indicating marker arranged to co-operate with the same record sheet, a timer, means operated by the travel of the car in which the apparatus is installed for driving said driver at a rate proportional to the travel of the car, and electromagnetic means operated by said timer for moving said marked at regular intervals in the travel of the timer, said electromagnetic means including a plurality of actuating magnets adapted respectively to cause the marker to make different characters of marks, and the timer including means for selectively completing the circuits of the several magnets.

9. An indicator for a recording instrument comprising a marker carrying arm, two electromagnets each arranged to move said arm when energized, a timer comprising a contact member in electrical connection with one of said magnets, a second contact member in electrical connection with the other of said magnets and a complemental contact in the circuit of the source of energy by which electric current is supplied to the magnets, and mechanism for producing relative movement between the two first described contact members and the third contact member in a path which causes the third contact member to be engaged successively with the other contact members.

10. An indicator for a recording apparatus comprising in combination means for propelling a record sheet at a uniform regulated speed, a marker arranged to co-operate with said sheet, a pivoted arm carrying said marker, two electromagnets arranged at different distances from the pivot of said arm in position to attract the arm, and a spring resisted yieldable stop arranged to limit the movement of the arm induced by one of said magnets and to yield when the arm is moved by the other magnet.

11. An indicator for a recording apparatus comprising in combination means for propelling a record sheet at a uniform regulated speed, a marker arranged to co-operate with said sheet, a pivoted arm carrying said marker, two electromagnets arranged at different distances from the pivot of said arm in position to attract the arm, a spring resisted yieldable stop arranged to limit the movement of the arm induced by one of said magnets and to yield when the arm is moved by the other magnet, and circuit controlling means for said magnets for selectively closing the circuits of the respective magnets at predetermined intervals.

12. The combination with a record sheet, of a marker, a pivoted arm carried by said marker, and means for selectively moving said marker through different distances comprising electromagnets arranged to exert attraction on the arm and located at respectively different distances from the pivot of the arm, a yieldable stop interposed in the path of the magnet-induced movement of said arm, a spring arranged to resist displacement of said stop, and means for regulating the force of said spring, whereby the stop may be caused to arrest the arm when the latter is moved by the magnet nearer to its pivot, and to permit yielding of the stop when the arm is moved by the attraction of the magnet which is farther from the pivot and therefore exerts the greater leverage on the arm.

In testimony whereof I have affixed my signature.

FRANK H. HOPKINS.